(12) United States Patent
Holmboe et al.

(10) Patent No.: US 7,785,093 B2
(45) Date of Patent: Aug. 31, 2010

(54) STEREOLITHOGRAPHIC APPARATUS

(75) Inventors: Scott B. Holmboe, Corvallis, OR (US); Gary L. Reynolds, Santa Clarita, CA (US); Matthew K. Stonesmith, Grand Junction, CO (US); Charles W. Hull, Santa Clarita, CA (US); Abraham N. Reichental, Simpsonville, NC (US)

(73) Assignee: 3D Systems, Inc., Rock Hill, SC (US)

( * ) Notice: Subject to any disclaimer, the term of this patent is extended or adjusted under 35 U.S.C. 154(b) by 1 day.

(21) Appl. No.: 12/124,591

(22) Filed: May 21, 2008

(65) Prior Publication Data

US 2008/0217818 A1    Sep. 11, 2008

Related U.S. Application Data

(63) Continuation of application No. 10/961,976, filed on Oct. 8, 2004, now abandoned.

(51) Int. Cl.
*B28B 17/00* (2006.01)
*B28B 1/14* (2006.01)
*B29B 13/08* (2006.01)

(52) U.S. Cl. .............. 425/185; 425/174.4; 425/375; 264/401; 264/308

(58) Field of Classification Search .......... 425/174.4, 425/375, 185; 264/308, 401, 113, 497
See application file for complete search history.

(56) References Cited

U.S. PATENT DOCUMENTS

| | | | |
|---|---|---|---|
| 3,652,193 A | 3/1972 | Adamik | |
| 3,896,904 A * | 7/1975 | Walker | 187/231 |
| 4,575,330 A | 3/1986 | Hull | |
| 4,783,348 A | 11/1988 | Albrecht et al. | |
| 5,048,487 A | 9/1991 | Fujimoto | |
| 5,071,337 A | 12/1991 | Heller et al. | |
| 5,096,530 A | 3/1992 | Cohen | |
| 5,174,931 A | 12/1992 | Almquist et al. | |
| 5,182,715 A | 1/1993 | Vorgitch et al. | |
| 5,184,307 A | 2/1993 | Hull et al. | |
| 5,236,637 A | 8/1993 | Hull | |
| 5,248,249 A | 9/1993 | Yamamoto et al. | |

(Continued)

FOREIGN PATENT DOCUMENTS

DE    EPX 1316408    * 12/2002    .............. 425/174.4

(Continued)

OTHER PUBLICATIONS

European Search Report for App. No. EP 6018481.9 dated Apr. 12, 2007.

(Continued)

*Primary Examiner*—Maria Veronica D Ewald
(74) *Attorney, Agent, or Firm*—Ralph D'Alessandro; Keith A. Roberson

(57) ABSTRACT

An improved stereolithography apparatus for forming three-dimensional objects using multiple chambered resin vats and a quick disconnect mounting system to permit concurrent use of multiple photopolymer build materials and easy change over of resin vats is disclosed. The apparatus permits easy change over from multiple chambered vat use to single chamber vat use and vice versa or change over between multiple chambered vats.

13 Claims, 9 Drawing Sheets

U.S. PATENT DOCUMENTS

| | | | |
|---|---|---|---|
| 5,258,146 A | 11/1993 | Almquist et al. |
| 5,340,297 A | 8/1994 | Takizawa et al. |
| 5,358,673 A | 10/1994 | Heller et al. |
| 5,569,431 A | 10/1996 | Hull |
| 5,571,471 A | 11/1996 | Hull |
| 5,573,722 A | 11/1996 | Hull |
| 5,626,919 A | 5/1997 | Chapman et al. |
| 5,651,934 A | 7/1997 | Almquist et al. |
| 5,688,464 A | 11/1997 | Jacobs et al. |
| 5,693,144 A | 12/1997 | Jacobs et al. |
| 5,885,511 A | 3/1999 | Heller et al. |
| 5,891,382 A | 4/1999 | Almquist et al. |
| 5,902,537 A | 5/1999 | Almquist et al. |
| 5,904,889 A | 5/1999 | Serbin et al. |
| 5,922,364 A | 7/1999 | Young, Jr. |
| 5,972,563 A | 10/1999 | Steinmann et al. |
| 6,048,487 A | 4/2000 | Almquist et al. |
| 6,157,663 A | 12/2000 | Wu et al. |
| 6,174,156 B1 | 1/2001 | Chapman et al. |
| 6,340,297 B1 | 1/2002 | Chapman et al. |
| 6,554,600 B1 | 4/2003 | Hofmann et al. |
| 6,733,267 B2 | 5/2004 | Chapman et al. |
| 6,885,511 B2 | 4/2005 | Nogami |
| 7,556,490 B2 * | 7/2009 | Wicker et al. | 425/375 |
| 2004/0026418 A1 | 2/2004 | Ederer et al. |
| 2004/0035542 A1 | 2/2004 | Ederer et al. |
| 2005/0263932 A1 | 12/2005 | Heugel |
| 2006/0022379 A1 | 2/2006 | Wicker et al. |
| 2006/0078638 A1 | 4/2006 | Holmboe |
| 2006/0219671 A1 | 10/2006 | Merot et al. |
| 2007/0074659 A1 | 4/2007 | Wahlstrom |
| 2007/0075458 A1 | 4/2007 | Wahlstrom et al. |
| 2007/0075459 A1 | 4/2007 | Reynolds |
| 2007/0075460 A1 | 4/2007 | Wahlstrom et al. |
| 2007/0075461 A1 | 4/2007 | Hunter et al. |
| 2007/0077323 A1 | 4/2007 | Stonesmith et al. |
| 2008/0217818 A1 | 9/2008 | Holmboe |

FOREIGN PATENT DOCUMENTS

| | | |
|---|---|---|
| EP | 0376571 | 7/1990 |
| EP | 1645402 | 4/2006 |
| EP | 1707341 | 10/2006 |
| GB | 2315699 | 2/1993 |
| JP | 55146015 | 11/1980 |
| JP | 6226864 | 8/1994 |
| JP | 3441203 | 6/1996 |
| JP | 8156105 | 6/1996 |
| JP | 8338753 | 12/1996 |
| JP | 2912721 | 6/1999 |
| JP | 11342541 | 12/1999 |
| JP | 3140741 | 12/2000 |
| WO | WO 9325377 | 12/1993 |
| WO | WO 0114125 | 3/2001 |
| WO | WO 0226420 | 4/2002 |
| WO | WO 0226478 | 4/2002 |
| WO | WO 2004/014636 A1 | 2/2004 |

OTHER PUBLICATIONS

Office Action in U.S. Appl. No. 11/240,822 mailed Dec. 19, 2007.
European Search Report for EP06076455 dated Sep. 28, 2006—2 pages.

* cited by examiner

STEREOLITHOGRAPHIC APPARATUS

CROSS REFERENCE TO RELATED APPLICATION

This application is a continuation of U.S. patent application Ser. No. 10/961,976, filed Oct. 8, 2004 now abandoned, which is hereby incorporated herein in its entirety by reference.

FIELD OF INVENTION

The present invention is directed to a stereolithographic apparatus for forming three-dimensional objects on a layer-by-layer basis and, more particularly, is directed to an apparatus having multiple resin vats or containers to permit more than one part location to be utilized during the building of stereolithographic objects and to permit easy and rapid change over of multiple resin vats or containers to a single vat or container, or between multiple vats by using an improved mounting system.

BACKGROUND OF THE INVENTION

In recent years, many different techniques for the fast production of three-dimensional models have been developed for industrial use. These are sometimes referred to as rapid prototyping and manufacturing ("RP&M") techniques. In general, rapid prototyping and manufacturing techniques build three-dimensional objects layer by layer from a working medium utilizing a sliced data set representing cross-sections of the object to be formed. Typically, an object representation is initially provided by a Computer Aided Design (CAD) system.

Stereolithography, presently the most common RP&M technique, may be defined as a technique for the automated fabrication of three-dimensional objects from a fluid-like material utilizing selective exposure of layers of the material at a working surface to solidify and adhere successive layers of the object (i.e. laminae). In stereolithography, data representing the three-dimensional object is input as, or converted into, two-dimensional layer data representing cross-sections of the object. Layers of material are successively formed and selectively transformed or solidified (i.e. cured) using a computer controlled laser beam of ultraviolet light (UV) into successive laminae according to the two-dimensional layer data. During transformation, the successive laminae are bonded to previously formed laminae to allow integral formation of the three-dimensional object. More recent designs have employed the use of visible light to initiate the polymerization reaction to cure the photopolymer build material that is commonly referred to as resin.

Stereolithography represents an unprecedented way to quickly make complex or simple parts without tooling. Since this technology depends on using a computer to generate its cross-sectional patterns, there is a natural data link to CAD/CAM. Such systems have encountered and had to overcome difficulties relating to shrinkage, curl and other distortions, as well as resolution, accuracy, and difficulties in producing certain object shapes.

Although stereolithography has shown itself to be an effective technique for forming three-dimensional objects, various improvements addressing the technology's difficulties and expanding the potential manufacturing applications have been desired for some time. Many improvements have addressed the aforementioned difficulties and have been made to object accuracy, speed and appearance of the build object over the years. A recent area of expansion of stereolithographic applications has been into the area of hearing aid shell manufacturing where digital data of a patient's ear is used to create a customized hearing aid shell. This is done on a large scale with as many as 160 hearing aid shells being manufactured in a single build using a stereolithography system. Many patients have two hearing aid shells made, one for each ear. Other patients require only a single hearing aid shell. Regardless, a convention has arisen among some manufacturers to color code the hearing aid shells according to which ear in which the shell is to be used. With the advent of biocompatible colored resins or build materials, a need has arisen for the ability to manufacture in a single build cycle hearing aid shells for both the left and the right ears. This requires the use of at least two separate vats within the context of the traditional stereolithography systems. Therefore there is the need for a stereolithography system to accommodate a second vat or resin material container so that hearing aid shells of two different colors can be manufactured in a single build cycle. Further, there is a need to permit easy change over of vats in a stereolithographic system between one and two vats or simply to be able to replace an existing vat.

These problems are solved in the design of the present invention.

SUMMARY OF THE INVENTION

It is an aspect of the present invention that a stereolithography apparatus is provided which permits the concurrent use of multiple chambered resin vats or photopolymer material containers during a single build cycle.

It is another aspect of the present invention that an improved design for securing the resin vats to the stereolithography system is provided to permit easy change over of the resin vats or photopolymer material containers from a single chambered vat to multiple chambered vats, or between multiple chambered vats.

It is a feature of the present invention that multiple resin vats or photopolymer material containers can be used concurrently during a single build cycle to create three-dimensional parts in a stereolithography system.

It is another feature of the present invention that the mounting system for the elevator legs in the resin vats or photopolymer material containers employ an easy release locking system.

It is yet another feature of the present invention that the resin vats or photopolymer material containers are removable from the stereolithography system with the elevator legs and support platforms.

It is still another feature of the present invention that the resin level within the multiple chambered resin vats or photopolymer containers is at the same level in each chamber during operation.

It is an advantage of the present invention that multiple resins, including differently colored resins, can be utilized concurrently in a stereolithography system to produce three-dimensional objects with different physical properties.

It is another advantage of the present invention that a simple resin vat and elevator leg mounting system is employed to permit easy and fast changing of resin vats or material containers and changing from single chambered vat operation to multiple chambered vat operation or vice versa.

It is still another advantage of the present invention that no cleaning of the stereolithography system parts is required between change over of vats.

These and other aspects, features, and advantages are obtained by the present invention through the use of a multiple chambered resin vat and a quick disconnect mounting system to permit concurrent use of multiple photopolymer build materials and easy change over of resin vats in a stereolithography system.

BRIEF DESCRIPTION OF THE DRAWING

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Stereolithography typically involves the layer by layer build-up of articles from a vat or container of liquid monomer. Stereolithography parts are preferably built on structures known as supports rather than directly on an elevator platform that moves the build object or part up and down as successive layers or laminae are formed during the stereolithography process. The vat of liquid photopolymer material provides a fresh material to create new layers as the object is built.

Figure 1:
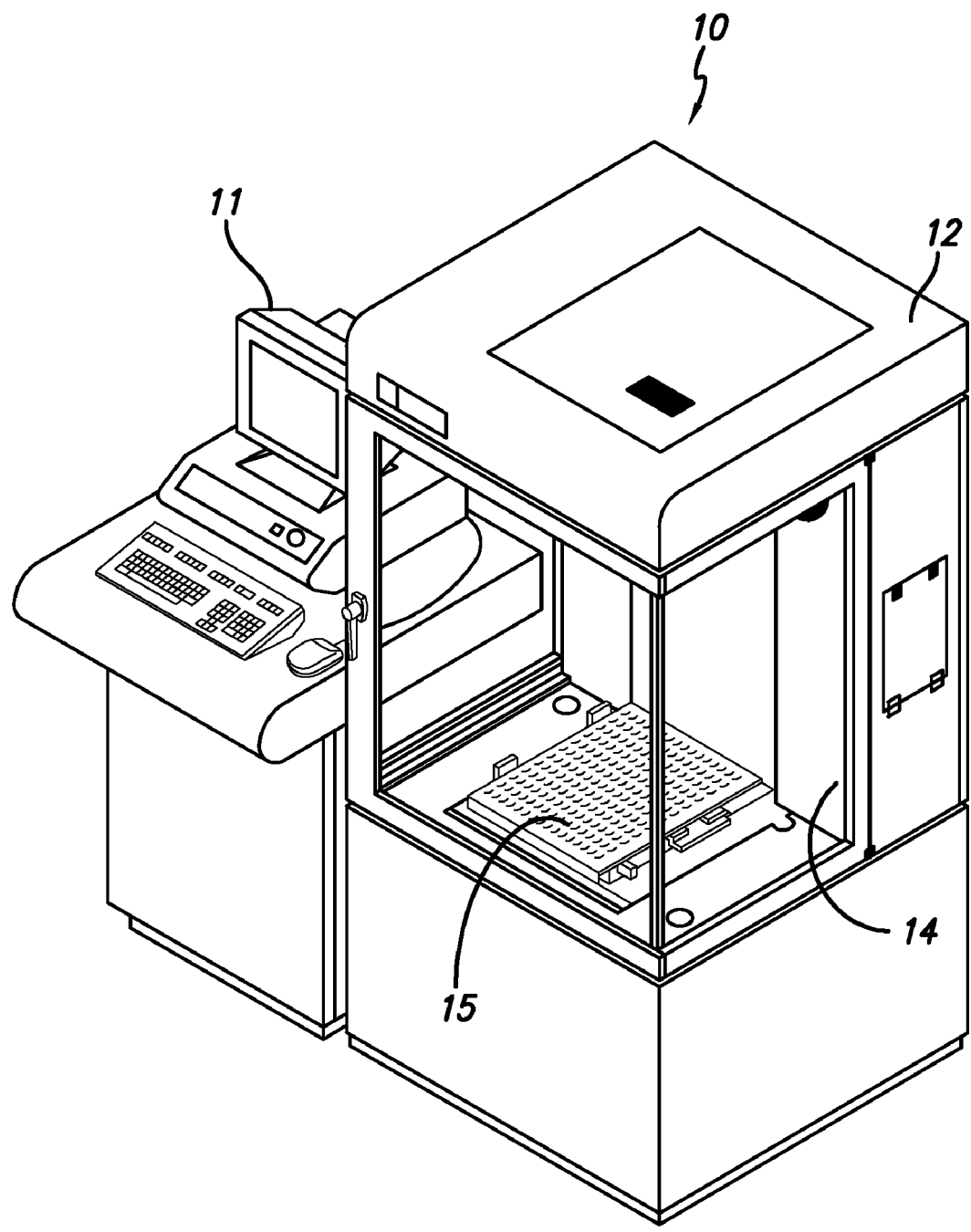
FIG. 1 is a front perspective view of a stereolithography system.

A typical stereolithography system is represented by the numeral 10 shown in FIG. 1. Such a system is offered commercially by 3D Systems, Inc. of Valencia, Calif. as the Viper si2™ SLA® system. The system 10 includes a computer console 11 with a control computer, computer terminal, and monitor. The system 10 also has a laser housing 12 that includes a laser, mirrors, crystal and other components of the laser system of the type described in U.S. Pat. No. 6,157,663 to Wu et al. and assigned to the assignee of the present invention. The laser system projects a beam onto the surface of the photocurable liquid or resin material in the vat to cure or solidify the liquid in the cross section or layer being formed. This photocuring operation takes place in an enclosed process chamber 14 and the part with its underlying support structure is formed on a support platform 15 that is moveable up and down in the vat of material by an elevator assembly.

Figure 2:
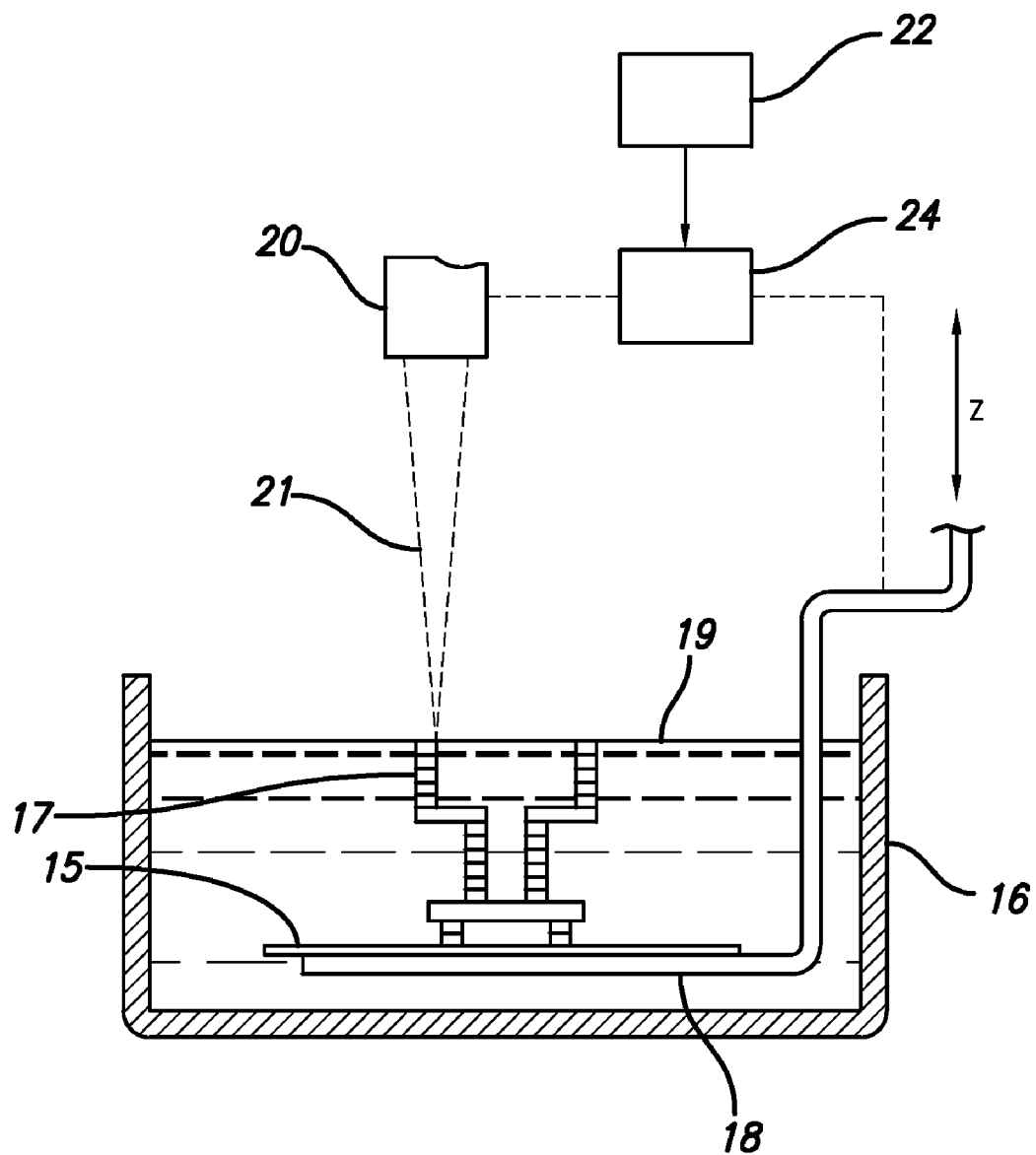
FIG. 2 is a diagrammatic illustration of the operation of a stereolithography system.

Looking now at FIG. 2, there is shown in a diagrammatic illustration a stereolithographic system that makes solid objects by successively creating thin layers of a solidified material one on top of the other by use of a programmable moveable spot beam of light shining on the surface of the UV curable liquid. FIG. 2 shows a laser 20 projecting a laser beam 21 onto the surface of the resin 19 to form the three dimensional object 17 that is supported on the support platform 15. The support platform 15 is raised and lowered by means of an elevator 18 which extends down into the vat 16 that contains the photocurable resin 19. Data is sent to the stereolithography system from a CAD station indicated by the numeral 22 that converts the CAD data to a suitable digital stereolithographic layer data format and feeds it to a computer control system 24 where the object data is manipulated to optimize the data and provide output vectors. The stereolithographic layer data format or STL file is a tessellated object description consisting of the X, Y, and Z coordinates of the three vertices of each surface polygon, as well as an index that describes the orientation of the surface normal. The surface polygons preferably are triangles. The manipulated data will reduce stress, curl and distortion, and increase resolution, strength, accuracy, speed and economy of reproduction, even for rather difficult and complex object shapes. The interfacing computer control system 24 generates layer data by slicing, varying layer thickness, rounding polygon vertices, filling, scaling, cross-hatching, offsetting vectors, ordering of vectors, and generating flat skins, near-flat skins, up-facing and down-facing skins.

The vector data and parameters from the computer control system 24 are directed to a controller subsystem for operating the system stereolithographic laser, mirrors, elevator and the like which permit the solid individual laminae that represent cross-sections of the build object or part to be generated and the laminae to be successfully combined to form the three-dimensional part. The part is generated by the application of an appropriate form of energy stimulation as a graphic pattern according to these vector data and parameters at the fluid medium surface to form the thin individual layers or laminae. Each solid layer or individual lamina represents an adjacent cross-section of the three-dimensional object to be produced. Successive adjacent layers or laminae are superimposed as they are formed to generate the three-dimensional object or part.

The programmable source of energy stimulation, in this instance the ultraviolet ("UV") light, is provided by a laser. Alternatively, new systems employing visible light such as DLP, systems may be used to cure the photocurable resin 19. Photomasks also can be utilized in either approach to selectively apply the energy stimulation, which may be any other appropriate form of energy to stimulate change from a liquid to a solid such as electron beam particle bombardment or application of chemically reactive materials. Operation of the SLA system 10 of FIG. 1 and its diagrammatic illustration in FIG. 2 is described in greater detail in U.S. Pat. No. 5,184,307 to Hull et al. and assigned to the assignee of the present invention.

Figure 3:
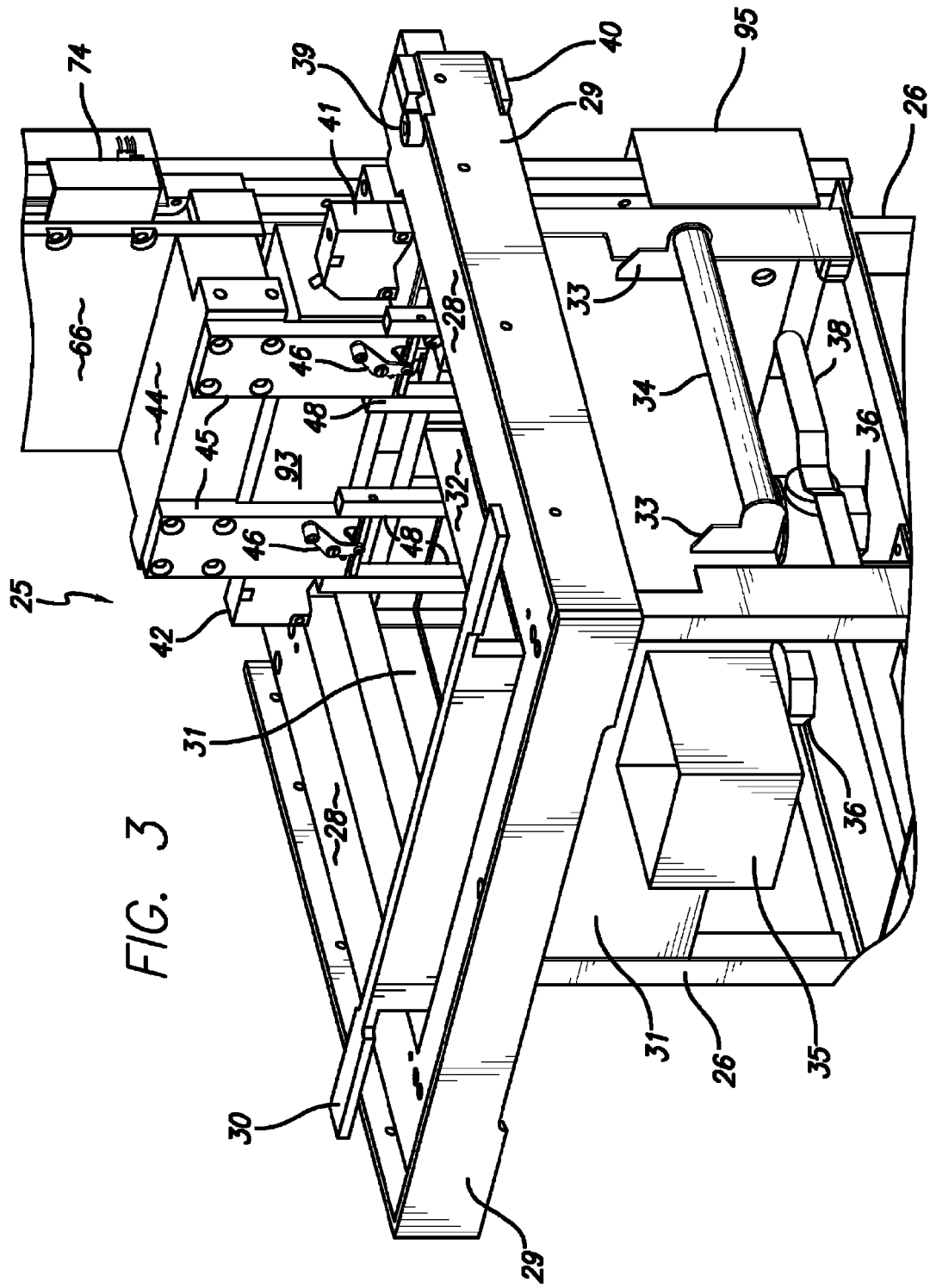
FIG. 3 is a partial perspective view of the multiple resin vat configuration of the frame and supporting structure of a stereolithography system of the present invention.

Turning now to FIG. 3, there is shown in a partial front perspective view the interior frame of an SLA system with its elevator and Z-stage assembly 25 holding a dual vat or resin container 31. The elevator and Z-stage assembly indicated generally by the numeral 25 has frame 26 that supports it and includes a machined aluminum vat rim 28 that encloses all four sides of the frame and to which a rim support 29 is bolted. Rim support 29 is also fastened to the frame (not shown) of the system 10. Rim support 29 has a bottom onto which the vat rim 28 sealingly seats. Vat rim 28 is kinematically mounted on three balls (not shown) to the frame 26.

A recoater device 30 is movably mounted onto the frame for movement front-to-back along the vat rim 28. However, in the dual vat configuration the recoater device is not employed. A recoater device 30 is employed where a single vat is utilized in the stereolithography system 10 and its operation is described in greater detail in U.S. Pat. No. 5,902,537 issued to Almquist et al. and assigned to the assignee of the present invention. An advantage of the present invention is that cleaning of the stereolithography system and especially the recoater device is not required during change over or exchange of multiple chambered vats to a single chamber vat.

The dual vat 31 illustrated in FIG. 3 has handles 34 (only one of which is shown) on both sides mounted to flanges 33, fastened to the side of the vat 31. A vat divider 32, best seen in FIGS. 4 and 8, separates the two chambers 31A and 31B of the vat (see briefly FIG. 4). Vat 31 with its two chambers thus can hold two different resins, such as a resin colored red or blue, or different pigmented or clear resins. A resin refill reservoir 35 is connected in fluid flow communication with one of the two vats in dual vat 31. In this configuration it is connected in fluid flow communication with vat chamber 31A that is known as the slave vat chamber as opposed to the master vat chamber 31B. Manually actuated ball valves 36, best seen in FIGS. 3 and 8, connect to the bottom of slave vat chamber 31A and master vat chamber 31B to permit resin to be drained through drain holes 37 when desired. The floors of vat chambers 31A and 31B slope downwardly toward the drain holes 37 to facilitate draining resin from the vat chambers. The manually actuated valves 36 are opened using vat drain handles 38.

Figure 8:
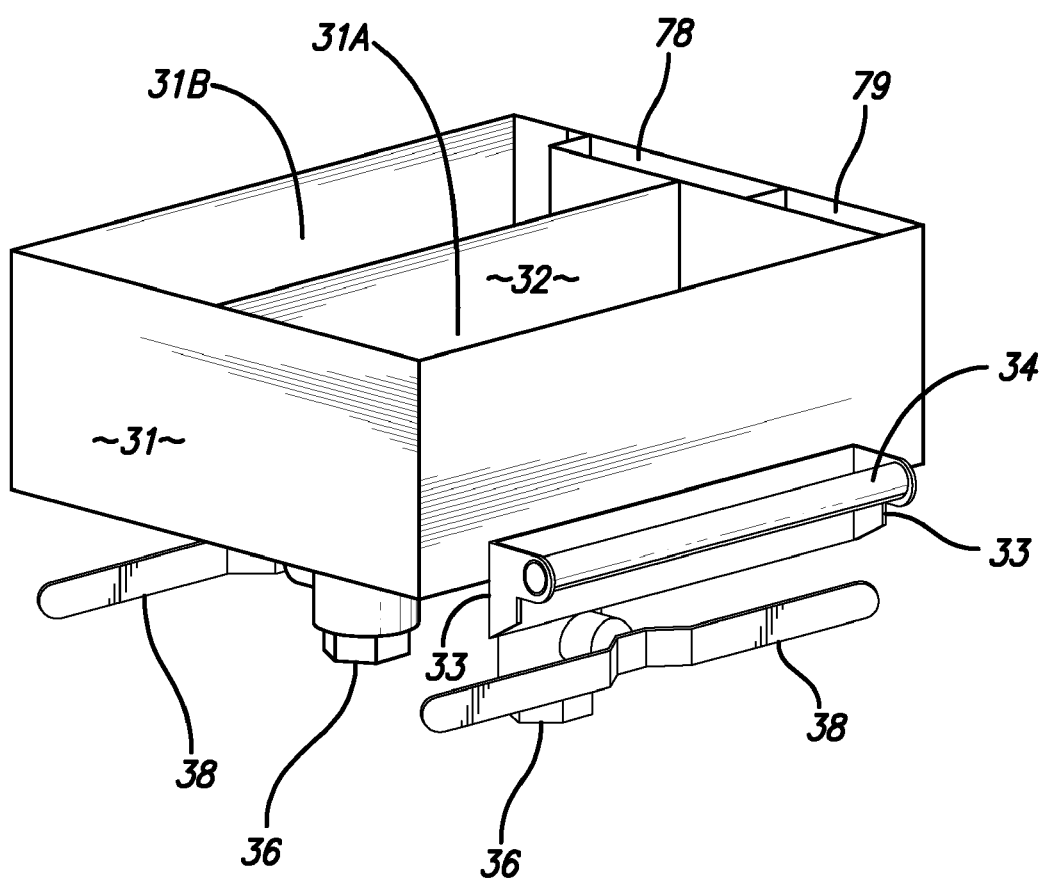
FIG. 8 is a side perspective view of a two resin vat system showing the separate drains for each vat of a stereolithography system of the present invention.

As seen in FIG. 8, there is a baffle 78 that is used to contain liquid resin during the vat leveling operation. The baffle 78 contains a single chamber and is open bottomed on its left side in master vat chamber 31B, but is closed on the bottom in slave vat chamber 31A. The slave vat chamber 31A also has an open bottomed baffle 79. Within baffle 78 a diode beam from leveling diode spy sensor assembly 42 and from laser leveling diode 93 senses the height of the resin in master vat chamber 31B. Sensor 93 moves the master vat chamber 31B to the correct height. Spy sensor assembly 42 uses the sensing of sensor 93 as a reference, records the height and provides a comparative value for laser diode assembly 41 to adjust the height of resin in slave vat chamber 31A to the same height as the resin in master vat chamber 31B. Sensor assemblies 41 and 42 are employed to ensure the level of resin in both vat chambers 31A and 31B are exactly the same height. Both laser diode sensor assemblies 41 and 42 employ an OMRON ZXLD30 optical sensor 43 to sense the height of the resin in slave vat chamber 31A and the master vat chamber 31B as described. Sensor assembly 41 senses the height of the resin in slave vat 31A inside baffled 79. A baffle is used to prevent gas bubbles in the vat chambers from interfering with obtaining exact resin height readings. Sensor assembly 41 compares the sensing from its sensor 43 with the signal from spy sensor assembly 42 to either add more resin from resin refill reservoir 35 or pump resin back into resin refill reservoir 35, as appropriate.

Dual vat 31 is raised up and down by a vat hoist (not shown) under the vat and which can be used to lower the vat to a fully lowered position when removal is needed in a manner to be described with respect to disconnection of the elevator legs 48.

Also seen in FIG. 3, attached to the vat rim is a ceramic laser beam rest stop 39 that permits the laser beam for the stereolithography system 10 to rest on a target that cannot be harmed when not imaging on the surface of the resin 19. A rim support 40 is shown adjacent ceramic laser beam rest 39 that helps fasten the rim support 29 to the vat rim 28.

Figure 4:
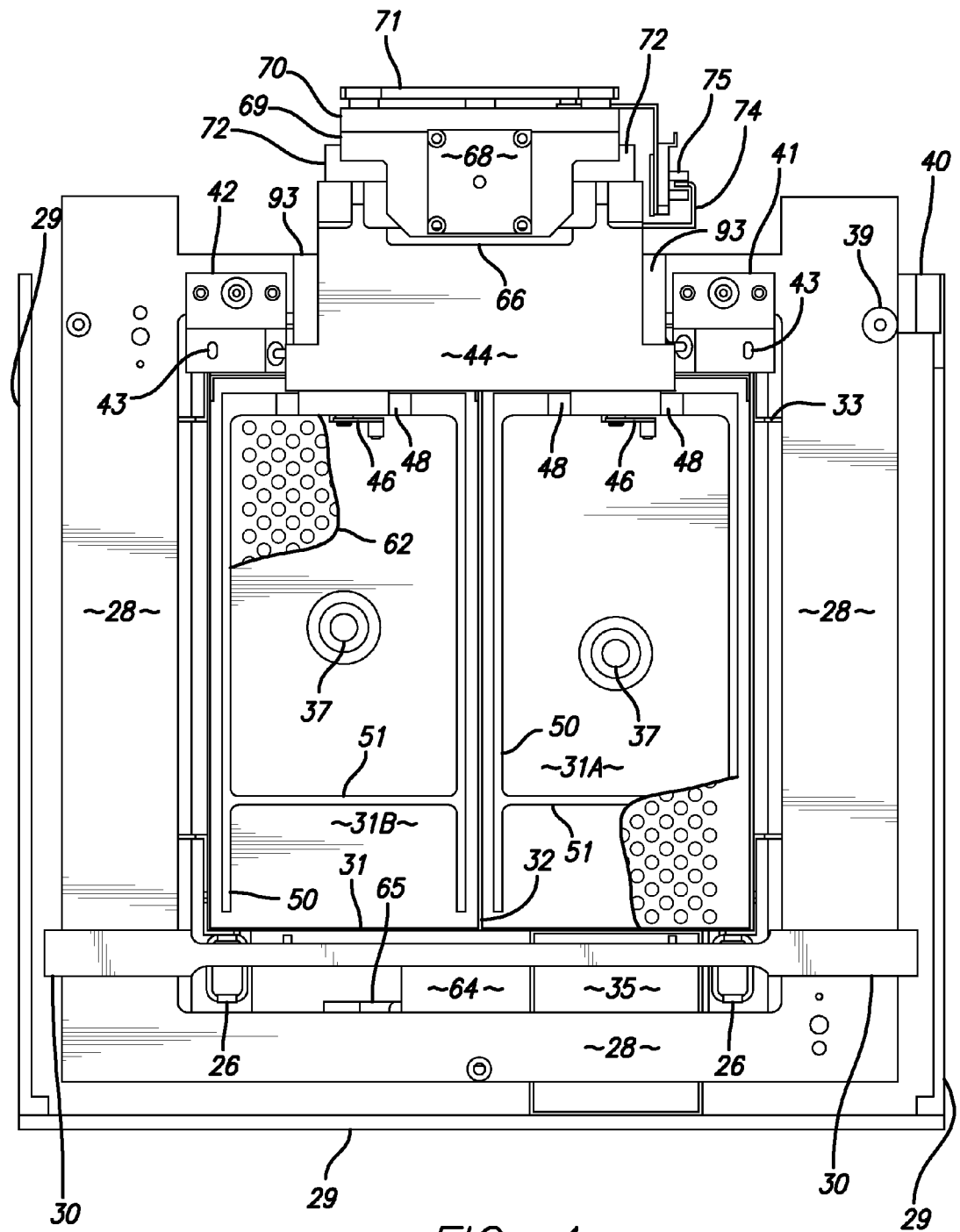
FIG. 4 is a top plan view of the stereolithography system having two resin vats mounted for concurrent operation.
Figure 5:
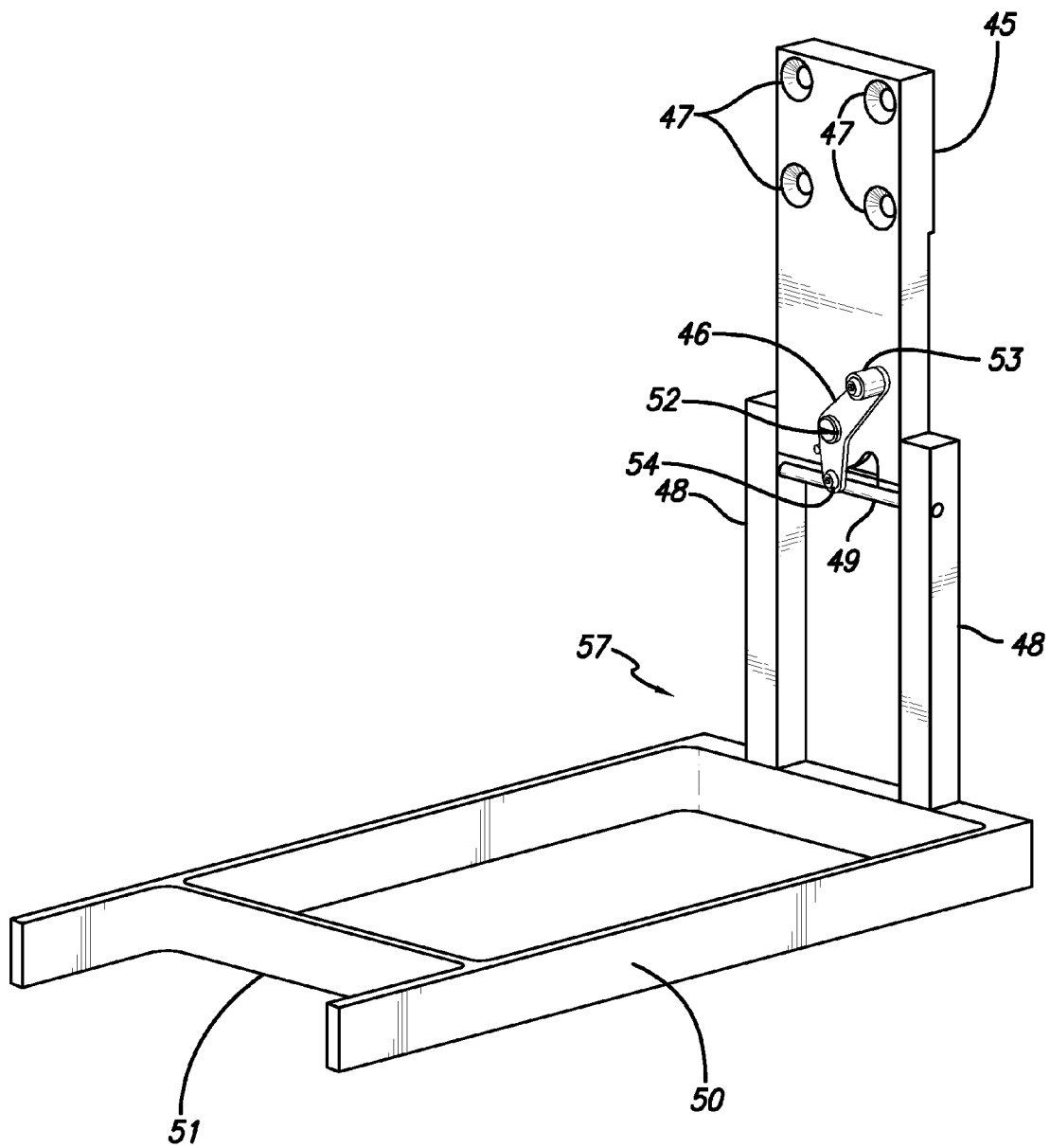
FIG. 5 is a side perspective view of the quick disconnect elevator arms of a stereolithography system of the present invention.
Figure 6:
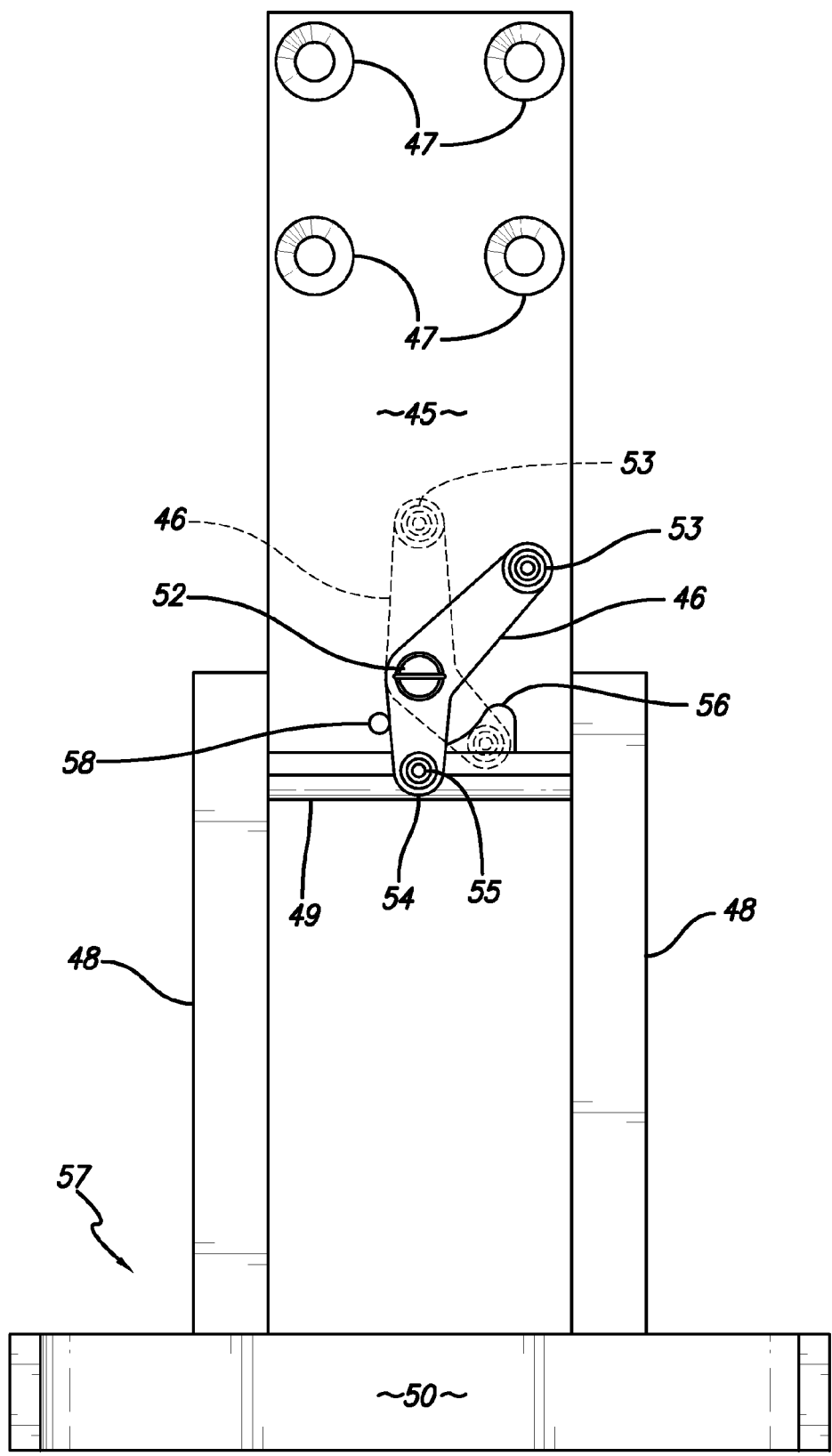
FIG. 6 is a front elevational view of the quick disconnect elevator arms and the locking device moved between an unlocked position shown in solid lines and a locked position shown in clotted lines of a stereolithography system of the present invention.
Figure 7:
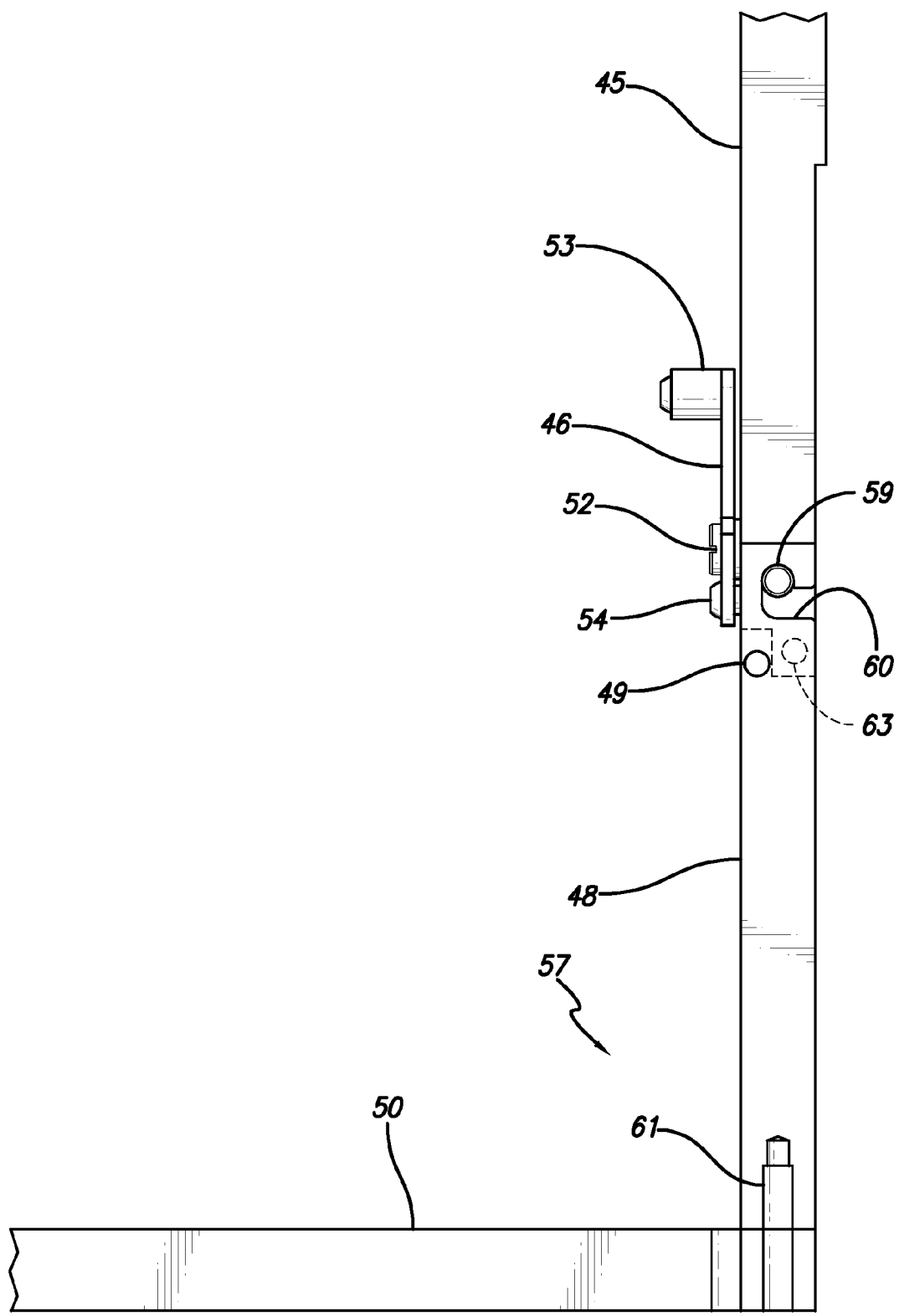
FIG. 7 is a side elevational view of the quick disconnect elevator arms and the locking device moved in a locked position of a stereolithography system of the present invention.

The elevator, indicated generally by the numeral 57, is best seen in FIGS. 5-7. For the dual vat configuration with dual vat or split vat 31, a pair of mounting brackets 45 are secured via four bolts through bolt holes 47 (see briefly FIG. 5) into mounting block 44 of the Z-stage saddle 66. Elevator legs 48 are connected to the mounting plates 45 in a manner to be described hereafter. Each platform 62 (see briefly FIG. 4) in the split vat 31 is supported by a pair of elevator legs 48 that are fastened to a welded stainless steel elevator frame 50. Frame 50 has a cross bar 51 connecting its opposing sides allowing the platform 62 to rest on top of it.

A vat quick disconnect locking lever 46, best seen in FIGS. 5 and 6, is pivotally or rotatably mounted to each mounting bracket 45 via a locking lever pivot screw 52. Lever 46 has a handle 53 and on its opposing end a rolling pin 54 fastened to the locking lever 46 by a mounting screw 55. An elevator leg locking bar 49 connects the two opposing elevator legs 48 for each elevator assembly supporting each elevator platform 62. As best seen in FIG. 6, the locking lever 46 is moveable between a locked position, shown in solid lines and an unlocked position shown in dotted lines. In the locked position, the rolling pin 54 is pressed in cam-like fashion against the locking bar 49 to secure the elevator in place. In the unlocked position the rolling pin 54 is pivoted up into the rolling pin recess 56. In the locked position, the locking lever 46 is stopped in its fully locked position by stop pin 58. As best seen in FIG. 7, the platform elevator legs 48 (only one of which is shown) fit over a pressed in pin or dowel 59 that extends about 2.5 inches from both sides of mounting plates 45. Elevator leg mounting groove 60 for each elevator leg 48 then fits over and hangs on pin 59. If locking lever 46 is not in the locked position, the elevator legs 48 are free to swing on pins 59. However, when locking lever 46 is in the locked position, rolling pin 54 presses against the locking bar 49 to hold the elevator legs 48 and the elevator assembly 57 and platform 62 firmly in position. A spring loaded ball detent 63 in the outer side of each mounting plate 45 pushes the outer elevator leg 48 of each pair outwardly to bias the elevator assembly 57 so it repeatably will be seated with the opposing elevator leg pulled snugly against mounting plate 45. Also as seen in FIG. 7, an elevator frame mounting pin 61 connects elevator frame 50 to the bottom of each elevator leg 48.

Returning now to FIG. 4, there is also shown in connection with the resin refill reservoir 35 a refill reservoir pump 64 that is driven by a pump electric motor 65. This motor turns a peristaltic pump or positive displacement pump that pumps resin in both directions between the reservoir 35 and the slave vat chamber 31A. As described previously, two sensors 42 and 41 match the height of the resin in the slave vat chamber 31A to the height of the resin in the master vat 31B by pumping resin into or removing it from slave vat chamber 31B. This is necessary because in the dual vat 31 configuration both vats must have the exact same level of resin. Resin recoating of the three dimensional part 17 being built in the dual vat 31 occurs by the deep dip process whereby after exposing and solidifying a layer of the object, the elevator assembly 57 is lowered with the platform 62 by the z-stage stepper motor 68 so that fresh resin flows over the top of the just exposed layer. The z-stage stepper motor 68 then raises the platform 62 with the recoated part on it to a height one layer thickness beneath the surface of the resin 19 in vat 31 and the laser beam than repeats the imaging to from the next layer.

As seen FIG. 4, the z-stage includes a saddle 66 and a z-stage stepper motor 68 mounted to a stepper motor mount 69 that raises and lowers the elevator assembly 57. The stepper motor 68 is connected to a ball screw that is connected to the z-stage saddle 66. The z-stage moves up and down on linear bearings 72 that ride in two vertical tracks (not shown). The stepper motor mount 69 is connected to a z-stage base 70 that is connected to the stereolithography system frame by a connecting bar 71. A z-stage flag 74 is sensed by an upper limit switch 75 to limit raising the height of the z-stage to its maximum. A corresponding lower limit switch and flag assembly 95 are shown briefly in FIG. 3.

Figure 9:
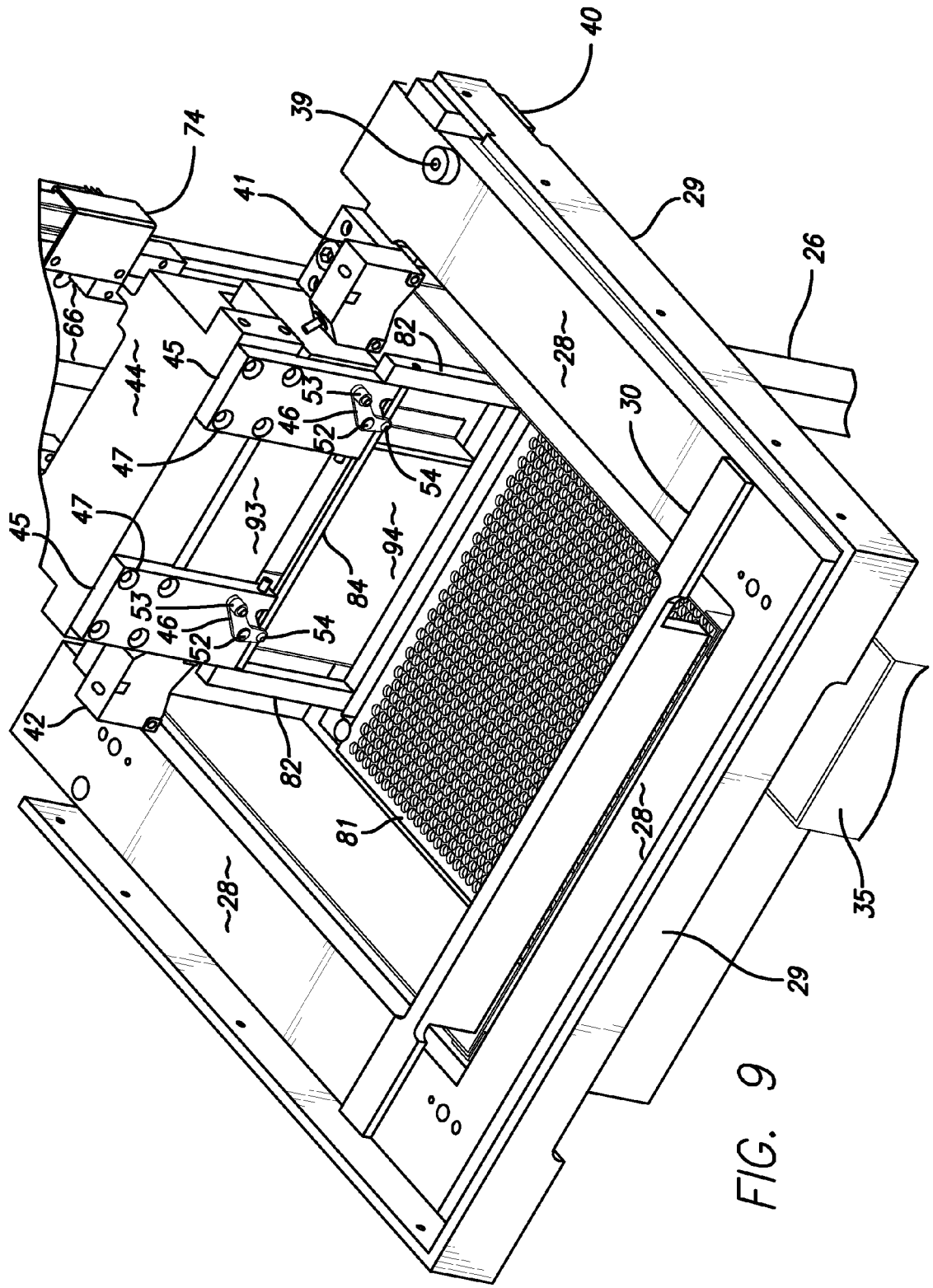
FIG. 9 is a partial perspective view of the single resin vat configuration of the frame and supporting structure of a stereolithography system of the present invention.

When a single vat is desired to be utilized, the locking levers 46 are moved to the unlocked position and the elevator arms 48 are removed from the mounting plate pins 59 by sliding the arms 48 off of the pins 59 and out of the grooves 60 to permit the elevator assembly 57 and the platform 62 in each vat chamber 31A and chamber 31B to be lowered into the vat. The vat hoist (not shown) then lowers the dual vat 31 and a cart is used to remove the dual vat 31 from the stereolithography system 10. A single chambered vat 80 is then moved into place by means of a cart rolling the vat into the frame 26. As seen in FIG. 9, the two outer mounting plate pins 59 on mounting plates 45 are employed with the single vat elevator legs locking bar 84 to lock the elevator legs 82 into place in the grooves 60 that are machined into the elevator legs 82 in the same manner as with the dual vat 31. The elevator legs 82 are similarly connected to a frame 50 that supports a support platform 81 on which three dimensional parts are built. The recoater blade 30 can then optionally be employed to recoat a fresh layer of resin over a just formed layer of the three dimensional part, if desired. Alternatively, the deep dip method can be employed. The laser diode leveler 93 is utilized in conjunction with baffle 94 to sense the level of liquid in the single chambered vat 80 and provide additional resin as required from the resin refill reservoir 35. This leveling operation is described in greater detail in U.S. Pat. No. 5,258,1146 to Almquist et al., assigned to the assignee of the present invention.

Any suitable fluid medium capable of solidification in response to the application of an appropriate form of energy stimulation may be employed in the practice of the present invention. Many liquid state chemicals are known which can be induced to change to solid state polymer plastic by irradiation with ultraviolet light or other forms of stimulation such as electron beams, visible or invisible light, or reactive chemicals applied by ink jet or via a suitable mask. Suitable photopolymers that may be employed in the practice of the present invention include any commercially available photopolymer manufactured by 3D Systems, Inc. of Valencia, Calif. These include, but are not limited to, SI10, SI20, SI 40, and SI 50 resins for use in any 3D Systems' commercially available SLA® system. Especially suitable for manufacturing hearing aid shells are the 7400, 7500, 7100 and 7300 series resins available from Dreve-Otoplastik GmbH of Unna, Germany. When manufacturing hearing aid shells the resin vats 31 or 80 are shallow, having a depth of about 2 to 3 inches.

The present invention can be practiced on any stereolithographic equipment, but has been discussed in the context of a Viper si2™ SLA® system available commercially from 3D Systems, Inc., the assignee of the present invention.

While the invention has been described above with references to specific embodiments thereof, it is apparent that many changes, modifications and variations in the materials, arrangements of parts and steps can be made without departing from the inventive concept disclosed herein. For example, the elevator arm quick release apparatus and method of the present invention can equally well be applied to permit replacement of individual ones of the chambers in dual vat 31 by having the dual vat chambers be separately formed in two separate and distinct containers each supported by their own elevator assembly. Then should just one vat need replacement or a different color be desired, the existing one of the two vat chambers can be released and removed and then replaced with a new vat chamber. Further, while only a dual chambered approach has been illustrated it is possible to employ a vat having more than two chambers or more than two separate and distinct chambers each supported by their own elevator assembly and individually removable. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. An apparatus for forming three dimensional objects from solidifiable liquid material in response to energy applied to a working surface of the material, the apparatus comprising:
   a. a frame;
   b. a source of energy mounted to the frame for applying energy to the solidifiable liquid material, wherein the source of energy is controlled based upon data representative of the three-dimensional objects;
   c. a removable container for holding the solidifiable liquid material, wherein the removable container is removable from the frame of the apparatus;
   d. a platform on which the three dimensional objects are formed, the platform being movably supported by at least one elevator leg and lowerable into the solidifiable liquid material within the container; and
   e. a z-stage stepper motor mounted to the frame that raises and lowers a mounting plate, wherein the at least one elevator leg is connected to the mounting plate with a quick disconnect locking device that allows the at least one elevator leg to be disconnectable from the mounting plate so that the at least one elevator leg and platform are removable with the container holding the solidifiable liquid material.

2. The apparatus according to claim 1 wherein the at least one elevator leg comprises two elevator legs and an elevator frame.

3. The apparatus according to claim 2 wherein the two elevator legs are connected with an elevator leg locking bar.

4. The apparatus according to claim 1 wherein the mounting plate is secured to a mounting block that is raised and lowered by the z-stage stepper motor.

5. The apparatus according to claim 1, wherein the quick disconnect locking device comprises a locking lever pivotally mounted to the mounting plate and movable between a locked position contacting and holding the at least one elevator leg and an unlocked position in which the at least one elevator leg can be removed from the mounting plate.

6. The apparatus according to claim 5, wherein the at least one elevator leg comprises two elevator legs that are connected with an elevator leg locking bar, and wherein the locking lever presses against the locking bar to lock the two elevator legs to the mounting plate.

7. The apparatus according to claim 1, wherein the container comprises multiple chambers holding different solidifiable liquid material.

8. The apparatus according to claim 1, wherein the source of energy comprises at least one of a UV laser and a visible light digital light projector.

9. The apparatus according to claim 8, wherein the solidifiable liquid material comprises a photopolymer resin.

10. An apparatus for forming three dimensional objects from solidifiable liquid material layer by layer in response to energy applied to a working surface of the material, the apparatus comprising:
   a. a frame;
   b. a removable container having a solidifiable liquid material for forming three dimensional objects, the container being removable from the frame; and
   c. a platform on which three dimensional objects are formed, the platform being movably supported by at least one elevator leg and lowerable into the container of solidifiable liquid material, the at least one elevator leg being disconnectable from a mounting plate that is raised and lowered relative to the frame, wherein the at least one elevator leg is disconnectable from the mounting plate by at least one quick release lever to permit removal of the container, the at least one elevator leg, and the platform from the frame.

11. The apparatus according to claim 10 wherein the at least one elevator leg comprises two elevator legs and an elevator frame.

12. The apparatus according to claim 11 wherein the two elevator legs are connected with an elevator leg locking bar.

13. The apparatus according to claim 10 wherein the mounting plate is secured to a mounting block that is raised and lowered by a z-stage stepper motor.

* * * * *